United States Patent [19]
Zahra et al.

[11] Patent Number: 5,312,289
[45] Date of Patent: May 17, 1994

[54] DEVICE FOR REMOVING MEMBRANES FROM MEAT PRODUCTS

[75] Inventors: Joe Zahra, Brampton; Cam Beatty; Grant Denison, both of Mississauga; Brent Cator, Oakville; Linda O'Hara; Zelia Roque, both of Mississauga; Ansel Lorde, Scarborough; David Bacon, Etobicoke, all of Canada

[73] Assignee: Cardinal Meat Specialists Limited, Mississauga, Ontario, Canada

[21] Appl. No.: 970,216

[22] Filed: Nov. 2, 1992

[51] Int. Cl.⁵ .............................................. A22B 5/16
[52] U.S. Cl. ................................... 452/131; 452/127
[58] Field of Search ............... 452/131, 127, 125, 134, 452/138, 81

[56] References Cited

U.S. PATENT DOCUMENTS

| | | | |
|---|---|---|---|
| 1,484,618 | 2/1924 | Blades | 452/131 |
| 1,764,425 | 6/1930 | Thomas | 452/131 |
| 2,928,118 | 3/1960 | Hairston | 452/81 |
| 5,183,434 | 2/1993 | Scheier et al. | 452/131 |

*Primary Examiner*—Willis Little
*Attorney, Agent, or Firm*—Bereskin & Parr

[57] ABSTRACT

A device for removing membranes from meat products having a source of pressurized fluid, a fixed upstanding nozzle, a conduit connecting the nozzle to the source of pressurized fluid and a blade connected to the nozzle. The nozzle can be used to direct fluid at the joint between the membrane and the meat product to begin to separate them. The blade means extending from the nozzle facilitates the separation of the membrane from the meat product. The preferred pressurized fluid is air. A method of membrane removal is also known.

18 Claims, 3 Drawing Sheets

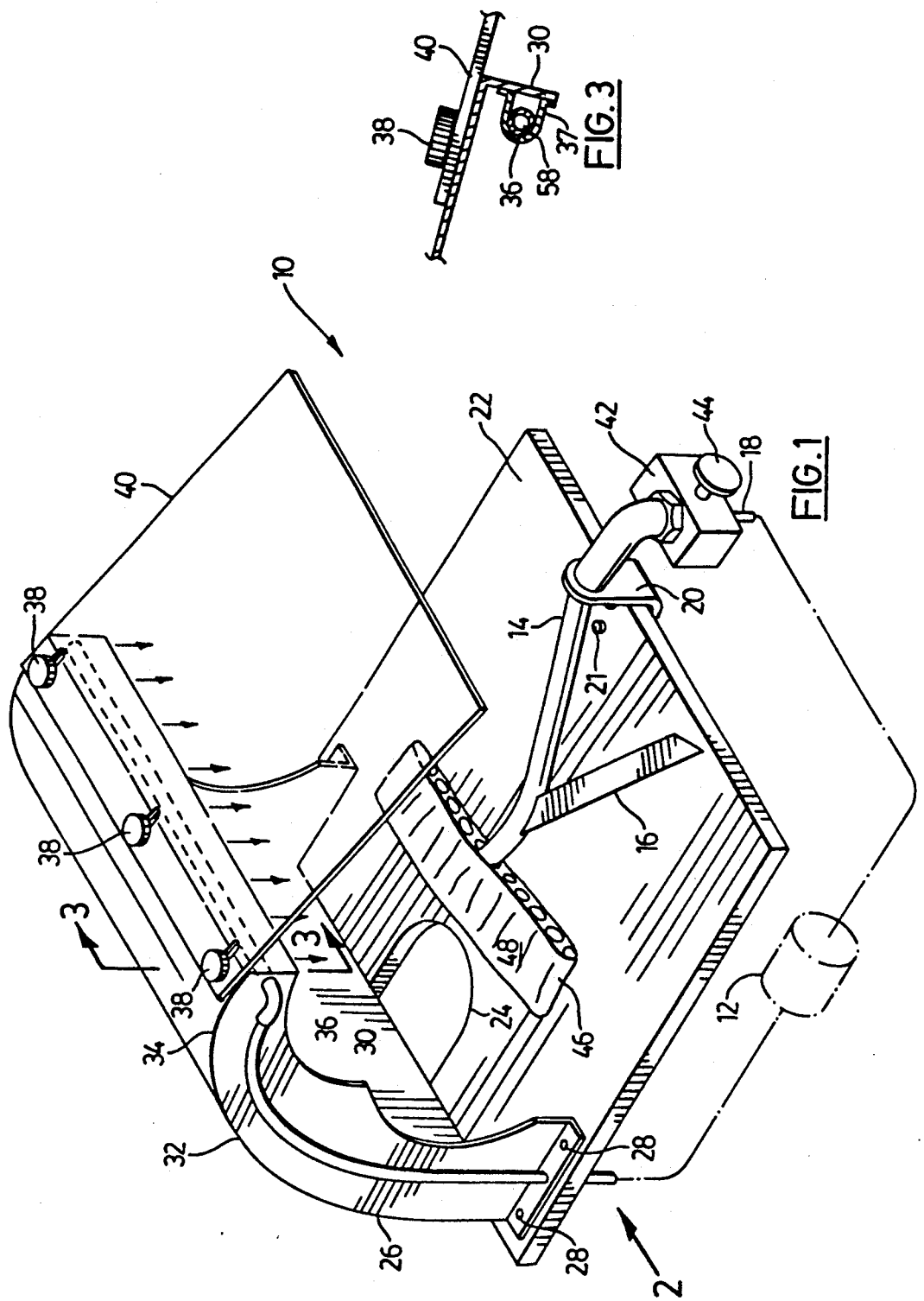

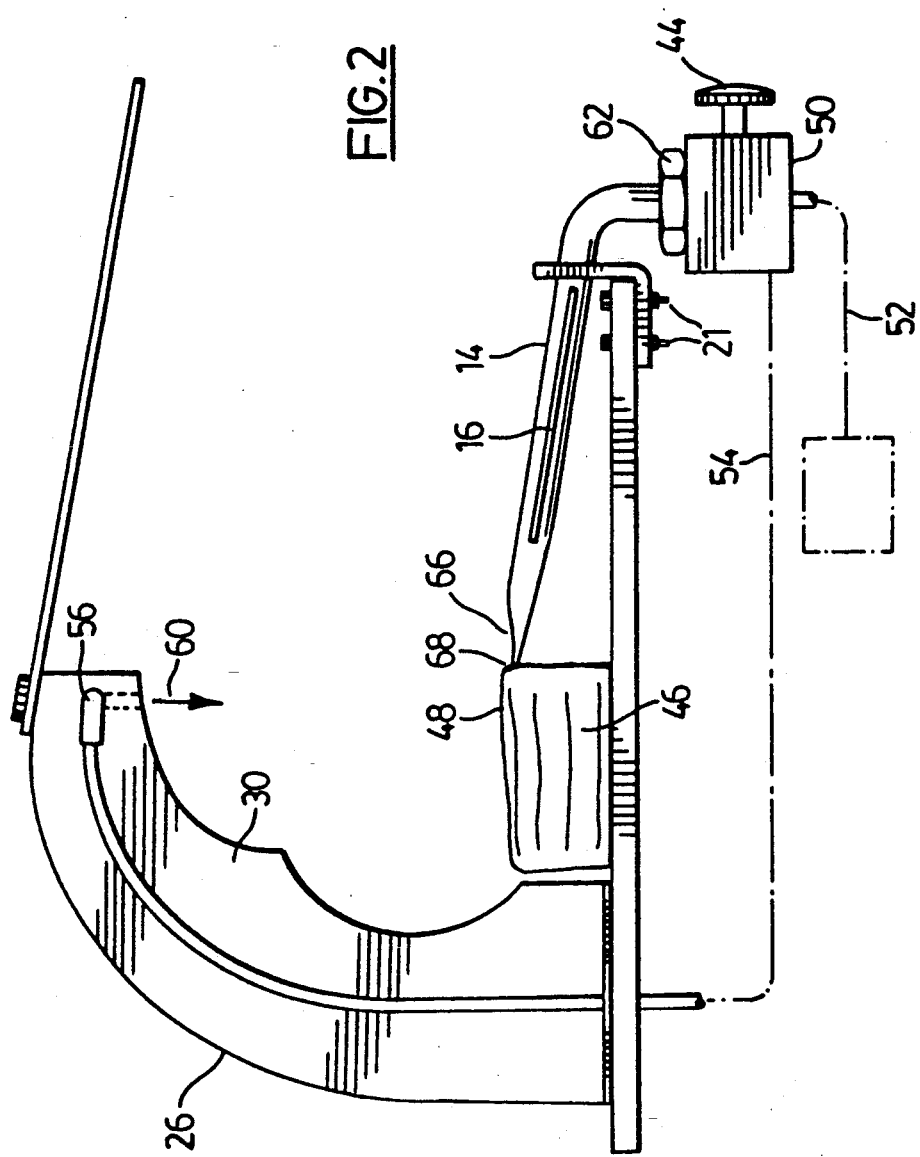

DEVICE FOR REMOVING MEMBRANES FROM MEAT PRODUCTS

BACKGROUND OF THE INVENTION

1. FIELD OF THE INVENTION

This invention relates generally to the field of meat packing and in particular to devices which may be used in meat packing operations to remove membranes from meat products.

2. DESCRIPTION OF THE PRIOR ART

In the meat packing field, there presently exists a number of different ways for removing membranes or skins from meat products. For example, U.S. Pat. Nos. 537,215 and 1,377,872 disclose methods for skinning whole animals, such as cattle, which essentially comprise inserting a nozzle underneath the animal's skin and activating a pneumatic valve to pressurize the end of the nozzle. In this manner, the skin can be lifted from the animal and separated from the carcass.

More recently, methods have been proposed for removing for example skin from fish which involve the use of pressurized liquid squirting from nozzles to remove the fish skin from the flesh. In some cases the skin may be pre-treated in an acid bath or the like to facilitate removal of the skin. Examples of this kind of skin removing device are shown in U.S. Pat. Nos. 3,546,738; 4,020,528; 3,453,684 and 4,765,030.

Additionally, there are devices of a type which involve mechanical gripping action, such as conical toothed rollers, for the purpose of removing the skin from meat products. An example of this type of product may be found in U.S. Pat. No. 4,856,143.

While some of these devices are stand alone devices others are integrated into conveyor systems for continuous processing of meat products.

While the foregoing processes and devices are suitable for certain applications, there are other applications where a particularly strong bond exists between a membrane or a skin and a meat product. In such cases, the use of remote nozzles to remove the membrane from the meat product may not be sufficient.

SUMMARY OF THE INVENTION

What is desired is a device which may easily be used to overcome the problems associated with removing membranes or skins from meat products. Therefore according to the present invention there is provided:

A device for removing membranes from meat products, said device comprising:
 a source of pressurized fluid;
 a fixed upstanding nozzle means;
 a conduit means connecting the nozzle means to the source of pressurized fluid; and
 a blade means connected to the nozzle means;
 wherein the nozzle means directs fluid under the membrane to separate the same from the meat product, and said blade means facilitates said separation of said membrane from said meat product.

According to another aspect of the present invention there is disclosed a method of removing membranes from meat products, said method comprising:
 manually positioning said meat product with an edge of the membrane exposed to a fixed nozzle having an integral skin separating blade;
 connecting said nozzle to a source of pressurized fluid inserting the nozzle between the membrane and the meat product;
 working the nozzle under the membrane to separate the membrane from the meat product until the skin separating blade is between the membrane and the meat product; and
 pulling the partially freed membrane fully off the meat product.

BRIEF DESCRIPTION OF THE DRAWINGS

Reference will now be made, by way of example only, to drawings which depict a preferred embodiment of the invention and in which FIG. 1 is a isometric view of an apparatus according to the present invention;

FIG. 2 is a side view of the apparatus of FIG. 1;

FIG. 3 is a sectional view along lines 3-3 of FIG. 1;

DETAILED DESCRIPTION OF THE PREFERRED EMBODIMENT

Figure 5:
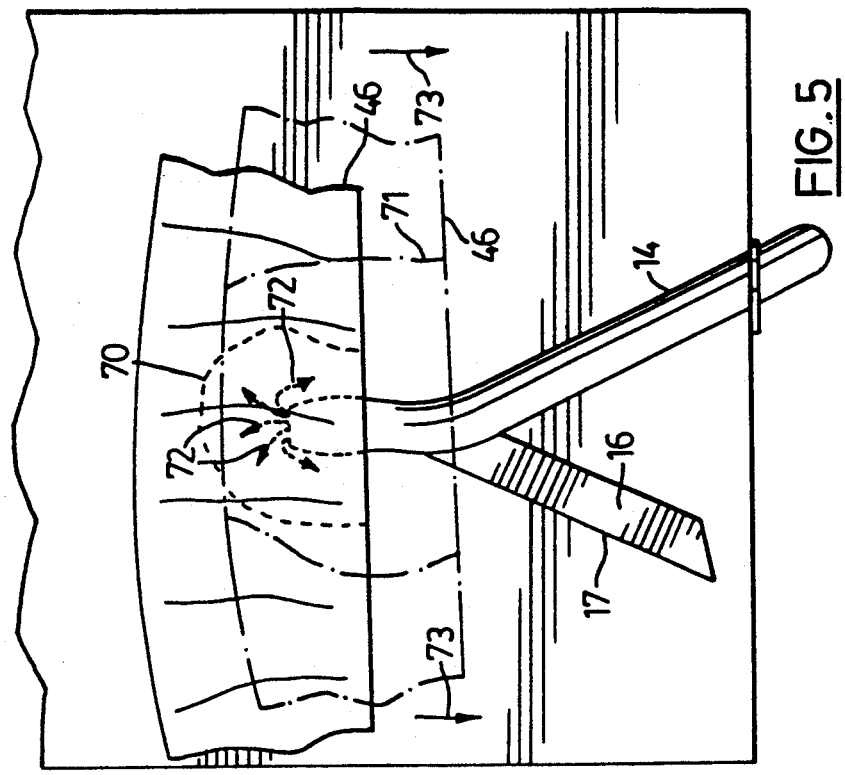
FIG. 5 is a further view of FIG. 4 showing the membrane removing device in operation.

A device for removing membranes from meat products according to the present invention as indicated generally as 10 in FIG. 1. The device 10 comprises a source of pressurized fluid 12, shown in dotted outline, a fixed upstanding nozzle means 14, a blade means 16 connected to the nozzle means 14, and a conduit 18 connecting the nozzle 14 to the source of pressurized fluid 12.

The nozzle 14 is shown fixed by a bracket 20 to a work surface 22. The bracket 20 may be formed from 3/16" stainless steel plate bent and then welded to the nozzle, such as by T.I.G. welding. The work surface 22 is preferably a food grade approved surface, such as ⅜" thick food grade contact approved polyethylene plastic. Preferably, 2×¼–20 1¼" S/S cap screws 21 are used, with 2×¼–20 S/S nylon locking nuts preferred.

Formed in the work surface 22 is a disposal hole or a chute 24. At the rear of the work surface 22 is a back shield 26 which may be attached to the work surface 22 by means of screws 28. It will be appreciated by those skilled in the art that other attachment means such as glue, nails and the like could be used in place of the screws 28 without departing from the scope of the present invention. The back shield 26 includes a forwardly projecting lip 30 which is located on either side of the back shield 26. The back shield 26 preferably curves upwardly as shown at 32 to a top end 34. The back shield is preferably made from 18 gauge stainless steel and may be formed on a brake press with a 90° corner, a rolled curved back and T.I.G. welding. The preferred dimensions are 12½" high, with a depth of 9". Located along the forwardly projecting lip 30 is a second conduit 36 which is explained in more detail below. At the top end 34 are located thumb screws 38 which may be used to releasably secure a transparent shield 40. The transparent shield 40 preferably extends outwardly above the nozzle 14.

The nozzle 14 is directed in the preferred embodiment towards the back shield 26. Located between the nozzle 14 and the source of pressurized fluid 12 is a valve 42. The valve 42 is preferably actuated by a plunger-type actuator 44 in such a manner that when plunger actuator 44 is depressed nozzle 14 is connected to the source of pressurized fluid 12.

Also shown in FIG. 1 is a meat product 46. The particular meat product 46 shown is a rib section. Rib sections, coming from a primary meat processing, are comprised of ribs, connecting tissues such as muscle and fat, and on the inside have a membrane 48 which is anatomically called the fasciae. This membrane encircles the organs located behind the rib cage in mammals. This membrane is very tough, and for certain applications, especially in the fast food industry, there is a demand for rib sections without the fasciae. However, because it is integrally joined to the rib section, it must be manually removed. The manner in which the membrane 48 is removed is detailed below.

Turning to FIG. 2, a side view of the device 10 is shown. As can be seen from FIG. 2, the plunger actuator 44 is housed in a control block 50. The control block 50 has one in-flow, namely conduit 52 from the source of pressurized fluid 12. Satisfactory results have been achieved where the source of pressurized fluid is a reservoir, which is fed, according to demand, by a compressor, in a known manner. The use of the reservoir evens out the flow, and prevents a loss of pressure due to aspiration or the like. The control block 50 has two outflows, namely conduits 54 shown in dashed outline and the fixed upstanding nozzle 14. When the plunger actuator 44 is depressed, conduit 52 is connected with both the nozzle 14 and the out-flow conduit 54. Preferably the actuator 44 is spring loaded to assume an outward closed position. Thus, in the absence of an operator pressing the actuator, no pressurized fluid is released.

The preferred form of pressurized fluid is air, and the preferred air pressure in the source of pressurized fluid is between 70 psi and 120 psi with 110 psi being most preferred.

The pressurized air flowing into conduit 54 flows upwardly along the forwardly projecting lip 30 of the back shield 26 until it reaches the apex shown as 56. There the conduit 36 traverses the back shield 26 and in this portion the conduit 36 includes a plurality of openings 58. The conduit 36 may be made from ⅛" stainless steel tubing, schedule 40, and there may be 12 5/64" holes or openings 58, generally formed in a line. In this manner a downwardly directed air curtain 60 is formed which facilitates the safe operation of the device as hereinafter described.

Turning to the nozzle 14, it can be seen that it is securely attached to the control block 50 by means of a nut 62. In addition, the bracket 20 is shown attached to the work surface by a pair of bolts 21 as previously described. Typically the control block 50 would also be mounted to a fixed surface. By being fixed at two points, the nozzle 14 is rigidly held in place. This is preferred as outlined below.

As can be seen in FIG. 2, the nozzle 14 tapers at 66 to an exit orifice 68. Satisfactory results have been obtained when the exit orifice is generally rectangular in shape and good results have been achieved with an inside height of between 0.010" and 0.020" with 0.015" being most preferred and a width of between ¼" and ¾" with ½" being most preferred. Preferably, the nozzle is made with some strong yet easily cleanable material such as stainless steel or metal. Good results have been obtained with ½" stainless steel pipe, schedule 40. Typically the exit orifice must be hand formed.

Also shown in FIG. 2 is the blade means 16. Preferably the blade means 16 has a sharpened insertion edge 17 by grinding, sharpening or the like, which facilitates the removal of the membrane 48 from the meat product 46 by a partial cutting action. It will also be noted that the nozzle 14 includes a partial S bend, shown at 15, so that for the length of the blade 16, the blade 16 and the nozzle 14 diverge. Satisfactory results have been obtained with a maximum divergence of about 6½". Both the insertion edge 17 and the divergence facilitate easy use of the invention, as described below. Preferably the blade is formed from 3/16" stainless steel plate, with ground polished edges, and is T.I.G. welded or otherwise secured to the nozzle 14, just behind the exit orifice 68.

Figure 4:
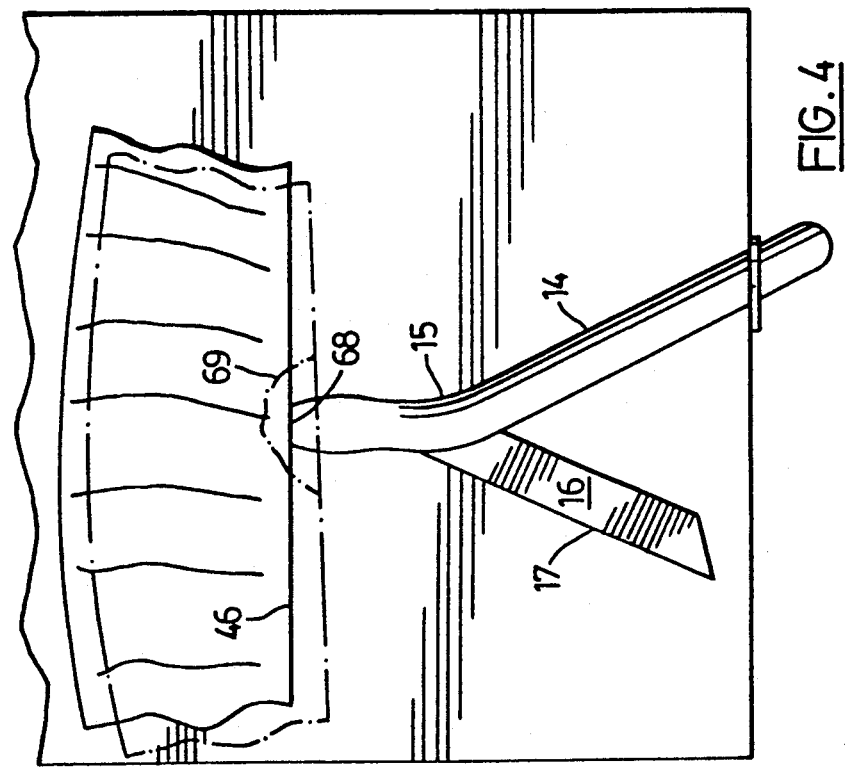
FIG. 4 is a close-up view of a portion of FIG. 1.

FIG. 4 shows an overview and a closeup of the instant invention. In this figure, the meat product 46 has been positioned, manually, so that the exit orifice 68 of the nozzle 14 is adjacent to the joint between the fasciae or membrane 48 and the remainder of the meat product 46. Then, the plunger actuator 44 may be depressed, allowing air to be rapidly expelled from the exit orifice 68. This stream of air attacks the joint between the membrane 48 and the meat product 46 and starts to lift the membrane 48 away from the meat product 46 forming a small pocket as shown in dotted outline as 69.

Turning to FIG. 5, the meat product 46 has now been pulled by an operator standing at the bottom of the figure in such a manner that the pocket now shown as 70 has expanded considerably until it occupies the full width shown at 71 of the product. Air flow is shown by arrows 72. In this position the plunger can be deactivated and the meat product brought closer to the operator as shown by arrows 73 whereby the blade 16 further separates the skin or membrane 48 from the meat product 46. Then, it is an easy matter for the operator to place one hand under the membrane the other hand on the remainder of the meat product and pull the two apart.

It can now be appreciated that upon depressing the actuator 44 there is a violent expulsion of air. This may cause bits and pieces of the membrane 48 or the rib section 46 to fly off away from the operator. Thus, it is important that the nozzle 14 operates in a direction away from the operator and it can now be appreciated how the back shield 26 operates. The back shield 26 prevents loose objects from being blown away or at anyone which is dangerous, and also prevents the air itself from impinging upon anyone.

Once the membrane section is removed it can be tossed down the chute 24 and the operator may pick up a fresh meat product to begin the process again.

It can now be appreciated that the operator goes through the following procedure. Firstly, a meat product is positioned with the joint between the membrane 48 and the meat product 46 adjacent the exit orifice 68 of the nozzle 14. Then, the operator by leaning forward against the actuator 44 connects the nozzle 14 with the source of pressurized fluid 12. At this point, the operator will have a hand on either side of the meat product and the nozzle 14 will be in between. For safety reasons it is necessary for the operator to hold on to the meat product 46. Further, it is preferable if the meat product 46 is held in two hands and thus having a hands free switch, such as plunger 44, to initiate the pressurized fluid is preferred.

Then, the operator will gradually advance the meat product past the orifice 68 allowing the pressurized air exiting the orifice 68 to form a gradually enlarging pocket, 69, 70 and 71 between the membrane 48 and the meat product 46. Then, the operator can use the blade 16 to facilitate further separation of the membrane 48 and the meat product 46. Once the membrane 48 is sufficiently separated from the meat product 46 that it can be easily gripped, the operator releases the actuator 44, which by reason of a spring or the like, will return to the closed position, thereby shutting off the pressurized fluid. Once the pressurized air stops, the operator can remove the meat product 46 from the nozzle 14, grab the loosened portion of the membrane 48 in one hand and the remainder of the meat product 46 in the other hand and complete the separation process by pulling his/her hands apart.

Throughout all of the foregoing steps, the operator is not required to make any combination of a gripping motion with twisting of the wrist motion as was previously required with knife-based manual membrane removing. By avoiding this gripping and twisting motion, the damaging effect on the nerves of the wrist of the operator, such as tunnel carpal syndrome, can also be avoided. Further, increased speed of processing can be achieved by reason of the ease with which the membrane 48 is initially separated from the meat product 46.

It will be appreciated by those skilled in the art that the foregoing description relates to a preferred embodiment of the invention and that other modifications and variations are possible without departing from the broad scope of the attached claims. Some of the modifications are suggested above and others will be apparent to those skilled in the art. For example, while reference is made to a plunger actuator 44 which may be leaned on to be activated, foot switches or other remote switches may also be suitably used.

We claim:

1. A device for removing membranes from meat products, said device comprising:
   a source of pressurized fluid;
   a fixed upstanding nozzle means;
   a conduit means connecting the nozzle means to the source of pressurized fluid: and
   a blade means connected behind the nozzle means and having a leading edge extending away from the nozzle means;
   wherein the nozzle means directs fluid under the membrane to separate an edge of the same from the meat product, and said blade means facilitates said separation of said membrane from said meat product.

2. The device for removing membranes as claimed in claim 1 wherein said nozzle means is fixed at a work station, said work station further including a shield to catch objects blown astray by said pressurized fluid.

3. The device for removing membranes as claimed in claim 2 wherein said shield surrounds a disposal chute.

4. The device for removing membranes as claimed in claim 3 wherein said shield includes an overhanging edge and a perforated conduit connected to said source of pressurized air located below said overhang, which forms an air curtain blowing down from the overhang upon being connected to said source of pressurized fluid.

5. The device for removing membranes as claimed in claim 4 wherein said shield further includes a transparent safety cover which extends over said nozzle means in such a manner that an operator using the nozzle means looks through said safety cover to position the meat product relative to the nozzle means.

6. The device for removing membranes as claimed in claim 1 wherein said nozzle means and said blade means diverge from one another to facilitate the removal of a from the meat product.

7. The device for removing membranes as claimed in 5 wherein said nozzle means includes an orifice having a long thin opening to be placed adjacent a joint between said membrane and said meat product to facilitate the insertion of the nozzle means between the membrane and the meat product.

8. The device for removing membranes as claimed in claim 7 wherein the blade means includes an insertion edge which is sharpened to assist in separating the membrane from the meat product.

9. The device for removing membranes as claimed in claim 7 wherein said nozzle has a long dimension of between $\frac{1}{4}''$ and $\frac{3}{4}''$.

10. The device for removing membranes as claimed in claim 7 wherein the nozzle means has a thin dimension of between 0.010" and 0.020".

11. The device for removing membranes as claimed in claim 7 wherein the nozzle means has a thin dimension of 0.015".

12. The device for removing membranes as claimed in claim 1 wherein the source of pressurized fluid has a pressure of between 70 psi and 120 psi.

13. The device for removing membranes as claimed in claim 1 including a valve means located between the source of pressurized fluid and the nozzle means to selectively activate the flow of fluid through the nozzle means.

14. The device for removing membranes as claimed in claim 13 wherein the valve means is actuable in a hands free manner.

15. The device for removing membranes as claimed in claim 14 wherein said valve means is actuable by an operator's foot, leg, or body.

16. A method of removing membranes from meat products, said method comprising:
   manually positioning said meat products so that an edge of the membrane is exposed to a fixed nozzle having an integral skin separating blade;
   connecting said nozzle to a source of pressurized fluid;
   inserting the nozzle between the membrane and the meat product;
   working the nozzle under the membrane to separate the membrane from the meat product until the skin separating blade is between the membrane and the meat product; and
   pulling a partially freed membrane fully off the meat product.

17. A method of removing membranes from meat products as claimed in claim 16 wherein said step of connecting said nozzle to said source of pressurized fluid is achieved by opening a hands free valve.

18. A method of removing membranes from meat products as claimed in claim 17 wherein said step of pulling the membrane fully off involves twisting said meat product relative to said nozzle and said blade to form an opening large enough to be able to grip the meat product in one hand and the membrane in the other hand to pull them apart.

* * * * *